Patented Mar. 2, 1954

2,671,112

UNITED STATES PATENT OFFICE 2,671,112

PROCESS FOR THE MANUFACTURE OF BETA-CAROTENE

Hans Herloff Inhoffen and Ferdinand Bohlmann, Braunschweig, Germany

No Drawing. Application April 17, 1951, Serial No. 221,526

Claims priority, application Germany April 21, 1950

9 Claims. (Cl. 260—598)

The present invention relates to the total synthesis of β-carotene.

The new process comprises condensing 4-[2',6',6'-trimethylcyclohexene-(1')-yl]-2-methyl-butene-(2)-al-(1) with a compound of the general formula $$HC \equiv C-X-OR$$

in which X represents one of the groups

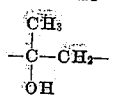

or

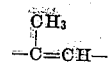

and R represents a hydrocarbon radical, converting the condensation product obtained by allyl rearrangement, if desired partial hydrogenation of the triple bond, dehydration and subsequent treatment with acid into 2,6-dimethyl-8-[2',6',6'-trimethylcyclohexene-(1')-yl]-octatriene-(2,4,6)-al-(1), or -octadiene-(5,7)-yne-(3)-al-(1) respectively, condensing this compound with acetylene dimagnesium bromide or lithium acetylide and, in any desired sequence, on the one hand dehydrating the dihydroxy compound formed with 40 carbon atoms and on the other hand hydrogenating the same at the triple bonds with 1 mol each of hydrogen.

The preparation of β-carotene may advantageously be effected from 4-[2',6',6'-trimethylcyclohexene-(1')-yl]-2-methyl-butene-(2)-al-(1) and 1-alkoxy-2-methyl-2-hydroxybutyne-(3) over 1-alkoxy-2,6-dimethyl-2,5-dihydroxy-8-[2',6',6'-trimethyl-cyclohexene-(1')-yl]-octene-(6)-yne-(3) and 2,6-dimethyl-8-[2',6',6'-trimethyl-cyclohexene-(1')-yl]-octatriene-(2,4,6)-al-(1). A particularly advantageous way of execution of the present invention consists in uniting 4-[2',6',6'-trimethylcyclohexene-(1')-yl]-2-methyl-butene-(2)-al-(1) with 1-methoxy-2-methyl-2-hydroxy-butyne-(3) by a lithium condensation, hydrolyzing the condensation product, subjecting the 1-methoxy-2,6-dimethyl-2,5-dihydroxy-8-[2',6',6'-trimethylcyclohexene-(1')-yl]-octene-(6)-yne-(3) formed to an allyl rearrangement by the action of acid, partially hydrogenating catalytically the 1-methoxy-2,6-dimethyl-2,7-dihydroxy-8-[2',6',6'-trimethylcyclohexene-(1')-yl]-octene-(5)-yne-(3) formed at the triple bond, boiling the hydrogenation product in toluene solution with p-toluene sulphonic acid and splitting off the enol ether by the action of acid, condensing the 2,6-dimethyl-8-[2',6',6'-trimethyl-cyclohexene-(1')-yl]-octatriene-(2,4,6)-al-(1) in ethereal solution with acetylene dimagnesium bromide, heating the 1,18-di-[2',6',6'-trimethyl-cyclohexene-(1')-yl]-3,7,12,16-tetramethyl-8,11-dihydroxy-octadecohexaene-(2,4,6,12,14,16)-yne-(9) obtained in toluene solution with p-toluene sulphonic acid and adding onto the triple bond of the 9,9'-dehydro-β-carotene thus obtained 1 mol of hydrogen with a palladium-calcium-carbonate catalyst inactivated by means of lead.

During the synthesis cis-forms of the β-carotene may be formed which can be transformed into all trans-β-carotene by isomerization, for instance, by means of iodine, heat or light.

The starting materials of the process may be prepared as follows:

4-[2',6',6'-trimethylcyclohexene-(1')-yl]-2-methyl-butene-(2)-al-(1) by glycide ester synthesis of β-ionone and chloroacetic ester and treatment with alkali of the glycide ester formed (Isler et al., "Helvetica Chimica Acta," volume 30, year 1947, page 1911).

1-methoxy-2-methyl-2-hydroxy-butyne-(3) from acetol methyl ether by addition of acetylene by means of lithium in liquid ammonia. Boiling point 57–58° C./19 mm.

1-methoxy-2-methyl-butene-(1)-yne-(3) from 1-methoxy-2-methyl-2-hydroxybutyne-(3) by dehydration through conducting vapours of the said compound over heated aluminum phosphate at above 300° C. (corresponding to the method of Heilbron et al., J. Chem. Soc., London, year 1949, page 291) boiling point 99–104° C.; active hydrogen 1.006.

1-ethoxy-2-methyl-butene-(1)-yne-(3) from acetol ethyl ether by addition of acetylene by means of lithium in liquid ammonia to produce 1-ethoxy-2-methyl-2-hydroxy-butyne-(3) and subsequent dehydration with aluminium phosphate at 300–310° C. Other 1-ethers of 1,2-dihydroxy-2-methyl-butyne-(3) and 1-hydroxy-2-methyl-butene-(1)-yne-(3) are formed from the corresponding acetol ethers under analogous reaction conditions.

The new process, according to the present invention, can be divided into three parts: First a $C_{19}$-aldehyde with 4 unsaturated bonds is formed from the $C_{14}$-aldehyde and a side chain with 5 carbon atoms. Thereupon two mols of this $C_{19}$-aldehyde are linked together with acetylene to form a dihydroxy compound with 40 carbon atoms. Finally this dihydroxy compound is transformed into β-carotene by dehydration and partial hydrogenation of the triple bond, whereby the cis-forms of the β-carotene thus obtained are converted by isomerization into trans-β-carotene.

(1) Synthesis of quadruply-unsaturated C₁₉-aldehyde

The condensation of 4-[2',6',6'-trimethylcyclohexene - (1') - yl] - 2 - methyl - butene - (2)-al-(1) with the 1-ethers of 1-hydroxy-2-methyl-butene-(1)-yne-(3) or 1,2-dihydroxy-2-methyl-butyne-(3) can be carried out by an alkali metal condensation as well as by a Grignard reaction. The condensation over the lithium compounds in ether solution is particularly suitable. If a hydroxyl group is present, the same is first protected by lithium. The hydrolysis of the salts of the condensation product formed can be carried out by means of a saturated ammonium chloride solution.

The transformation of the resulting condensation product of the formula

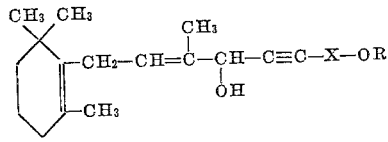

in which X means one of the groups

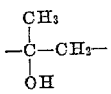

or

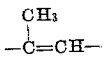

and R represents a hydrocarbon radical, into the C₁₉-aldehyde compounds can be effected by allyl rearrangement, dehydration and acid treatment, whereby 1 mol of hydrogen may be added onto the triple bond after the allyl rearrangement. For such purpose 1-methoxy-2,6-dimethyl-2,5-dihydroxy - 8 - [2',6',6' - trimethylcyclohexene - (1')-yl]-octene-(6)-yne-(3) may be rearranged by allowing the compound to stand for about 48 hours in alcoholic solution with 1 per cent. aqueous sulphuric acid to produce 1-methoxy-2,6 - dimethyl - 2,7 - dihydroxy - 8 - [2',6',6' - trimethylcyclohexene - (1') - yl] - octene - (5) - yne-(3); the addition of 1 mol of hydrogen onto the triple bond by catalytic hydrogenation in methanol solution with a little active palladium catalyst yields 1-methoxy-2,6-dimethyl-2,7-dihydroxy - 8 - [2',6',6' - trimethylcyclohexene - (1')-yl]-octadiene-(3,5); by dehydration, for instance by boiling with p-toluene sulphonic acid in toluene solution or with phosphorous oxychloride in toluene-pyridine solution, the 1-methoxy - 2,6 - dimethyl - 8 - [2',6',6' - trimethylcyclohexene - (1') - yl] - octatetraene - (1,3,5,7) is formed and the acid cleavage of this enol ether leads, under rearrangement, to 2,6-dimethyl - 8 - [2',6',6' - trimethylcyclohexene - (1')-yl]-octatriene-(2,4,6)-al-(1). The same aldehyde may also be obtained in a similar manner from 1 - methoxy - 2,6 - dimethyl - 5 - hydroxy - 8 - [2',6',6' - trimethylcyclohexene - (1') - yl] - octadiene-(1,6)- yne-(3).

2,6 - dimethyl - 8 - [2',6',6' - trimethylcyclohexene - (1') - yl] - octadiene - (5,7) - yne - (3)-al-(1) is formed from 1-methoxy-2,6-dimethyl - 2,5 - dihydroxy - 8 - [2',6',6' - trimethylcyclohexene - (1') - yl] - octene - (6) - yne-(3) by allyl rearrangement and dehydration by means of phosphorous oxychloride and pyridine to toluene solution and acid treatment of the 1-methoxy-2,6-dimethyl - 8 - [2',6',6' - trimethylcyclohexene-(1')-yl] - octatriene-(1,5,7)-yne-(3). The same aldehyde can also be obtained from 1-methoxy-2,6-dimethyl-5-hydroxy-8 - [2',6',6'-trimethylcyclohexene - (1') - yl - octadiene -(1,6)-yne-(3) by allyl rearrangement, dehydration and subsequent acid treatment.

(2) Preparation of the dihydroxy compound with 40 carbon atoms 1 mol of acetylene dimagnesium bromide or lithium acetylide is reacted with 2 equivalents of 2,6 - dimethyl - 8 - [2',6',6' - trimethylcyclohexene - (1') - yl] - octatriene - (2,4,6) - al - (1). The condensation can be effected in the usual solvents, for instance, ethyl ether. The magnesium- or lithium salt formed is hydrolyzed in the usual way, for instance, with an ammonium chloride solution or with dilute sulphuric acid. The 1,18-di-[2',6',6'-trimethylcyclohexene (1') - yl] - 3,7,12,16-tetramethyl - 8,11 - dihydroxy - octadecahexaene - (2,4,6,12,14,16) - yne - (9) (hereinafter called "dihydroxyhexenine compound") obtained can be purified by means of liquid-liquid extraction or by chromatography. In the chromatogram it shows approximately the same adhesiveness as xanthophyll; it cannot be extracted from 92 per cent. methyl alcohol by means of petroleum ether. The pure compound possesses a molecular weight of 570. As evidenced by complete hydrogenation and determination according to Zerewitinoff, the said compound contain 8 double bonds, 1 triple bond and 2 hydroxyl groups.

In precisely the same manner, the preparation and the purification of the 1,18-di-[2',6',6'-trimethylcyclohexene - (1') - yl] - 3,7,12,16 - tetramethyl - 8,11 - dihydroxy - octadecatetraene - (1,3,15,17)triyne-(5,9,13) (hereinafter called "dihydroxytetraenetriyne compound") from 2 mols of 2,6-dimethyl-8-[2',6',6'-trimethylcyclohexene-(1') - yl] - octadiene - (5,7) - yne - (3) - al - (1) and acetylene dimagnesium bromide or lithium acetylide may be effected.

(3) Transformation to β-carotene

The above named dihydroxyhexenine compound with 40 carbon atoms is dehydrated with a view to introducing two new double bonds. The dehydration is suitably effected with p-toluene sulphonic acid in boiling toluene. This dehydration process is preceded by allyl rearrangement. The hydrocarbon compound formed (9,9'-dehydro-β-carotene, i. e. 1,18-di-[2',6',6'-trimethylcyclohexene - (1') - yl] - 3,7,12,16 - tetramethyl-octadecaoctaene-(1,3,5,7,11,13,15,17) - yne - (9)) can be extracted from 92 per cent. methyl alcohol with petroleum ether. The unreacted dihydroxyhexenine compound which remains behind in the methyl alcoholic solution, can be isolated and once more subjected to dehydration.

The 9,9'-dehydro-β-carotene obtained by splitting off water is, suitably after purification, subjected to partial hydrogenation at the triple bond. This may be achieved in the same way as effective for other polyenes, for instance, by catalytic hydrogenation in the presence of palladium catalysts, whereby the activity of the palladium has been reduced by the addition of lead and quinoline. The introduction of hydrogen is interrupted after 1 mol of hydrogen has been taken up. The β-carotene thus obtained is isomerized, if necessary, by treatment with iodine, heat or light. By working up carefully the hydrogenation product, 9,9'-mono-cis-β-carotene is first obtained in a very good yield, which is isomerized advantageously by warming or, preferably, by exposure to light, to produce all-trans-β-carotene.

The partial hydrogenation of the triple bond can also be carried out prior to dehydration. The transformation to β-carotene then follows the following course (with smaller yield): Partial hydrogenation of the triple bond, dehydration and, in given cases, isomerization. The methods for the execution of the single steps are substantially the same as described above.

In an analogous manner, the dihydroxytetraenetriyne compound with 40 carbon atoms can be transformed to β-carotene. The measures to be taken in the single steps are the same as described for the dihydroxyhexenine compound. No allyl rearrangement takes place during the dehydration and during the partial hydrogenation the introduction of hydrogen is interrupted after 3 mols of hydrogen have been taken up. The yields of this modification are considerably smaller than those attained by the preferred way of synthesis.

According to the present invention as set forth above synthetic β-carotene is obtained which can be purified by the same methods as employed for carotene concentrates prepared from natural sources. (Separation by liquid-liquid extraction, chromatography and crystallization.) It is recommendable to add antioxydants which may also be present during the whole course of the synthesis; tocopherols are especially suitable for this purpose. In working up the products of the synthesis, cis-forms of the β-carotene can be isolated which, by treatment with iodine, heat or exposure to light, can be isomerized to obtain "all-trans"-β-carotene. The isomerization by the aid of iodine, which leads to a mixture of isomers, is known. The isomerization by exposure to light takes a uniform course in the case of the 9,9'-cis-β-carotene; it is suitably carried out in an inert solvent, such as hexane. The rearrangement is considerably quicker with day-light than with the light of a mercury lamp. The rearrangement by heating and exclusion of light may be effected with the dissolved as well as with the melted substance; in the case of the 9,9'-cis-β-carotene, an equilibrium is already attained after 1½ hours at 70° C., at which all-trans-β-carotene is predominant.

The all-trans-β-carotene obtained directly or by isomerization corresponds in all its properties with β-carotene obtained from natural materials and, in particular, it possesses the same biological activity.

EXAMPLE 1

In a 2 liter three-necked flask provided with stirrer, dropping funnel and reflux condenser a solution of lithium phenyl in 500 cc. of ether (content: 3.7 grams of lithium=0.55 mols) is added dropwise, in a nitrogen atmosphere, to 30.7 grams (0.27 mols) of 1-methoxy-2-methyl-2-hydroxy-butyne-(3) in 60 cc. of absolute ether. The pasty reaction mixture is heated to boiling for 45 minutes and after cooling 48 grams (0.23 mols) of 4-[2',6',6'-trimethylcyclohexene-(1')-yl]-2-methylbutene-(2)-al-(1) in 85 cc. of absolute ether are added. The white precipitate dissolves slowly. To terminate the reaction, the solution, after standing overnight, is heated to boiling for ½ hour. After cooling down, the mixture is decomposed with a solution of 50 grams of ammonium chloride, while cooling; the ether solution is washed with water and dried over sodium sulphate. The brown-red oil remaining behind after the evaporation of the ether is dissolved in 550 cc. of petroleum ether and shaken out four times with 180 cc. each of 80 per cent. methanol. The united methanol extracts are once again washed with petroleum ether and 2 liters of water are added. The separated oil is taken up in petroleum ether (boiling point 30-50° C.) and the aqueous layer is shaken out twice with a mixture of petroleum ether and ether (4:1). The united petroleum ether solutions are washed with water, dried and evaporated. 60 grams (=76 per cent. of the theoretical quantity) of 1-methoxy-2,6-dimethyl-2,5 - dihydroxy - 8 - trimethylcyclohexenyl - octene-(6)-yne-(3) are obtained as a red oil. The same is dissolved in 450 cc. of petroleum ether and stirred for 24 hours under nitrogen at −30° C. 23.8 grams (32 per cent. of the theoretical quantity) of white crystals are then separated which can be recrystallized from petroleum ether (boiling point 60-80° C.). (Since the above mixture is a mixture of isomers, no sharp melting point can be given.) In addition, 35 grams of a viscous oil, which does not crystallize, are obtained from the petroleum ether solution. The determination according to Zerewitinoff shows 2 atoms of active hydrogen; ultraviolet absorption: no absorption above 230 mμ. For the further treatment the crystallized and oily 1 - methoxy - 2,6 - dimethyl - 2,5 - dihydroxy - 8 - trimethylcyclohexenyl - octene - (6) - yne - (3) are employed.

50 grams of 1-methoxy-2,6-dimethyl-2,5-dihydroxy - 8 - trimethylcyclohexenyl - octene - (6) - yne-(3) are dissolved in 1 liter of alcohol and 250 cc. of 5 per cent. sulphuric acid are added. After 48 hours, the mixture is poured into water, extracted with ether, washed neutral, dried and evaporated. The 1-methoxy-2,6-dimethyl-2,7-dihydroxy-8-[2',6',6'-trimethylcyclohexene-(1')-yl]-octene-(5)-yne-(3) remains behind as an almost colourless viscous oil. Ultraviolet maximum: λ=233 mμ (ε=15'500).

40 grams of 1-methoxy-2,6-dimethyl-2,7-dihydroxy-8-[2',6',6'-trimethylcyclohexene-(1')-yl]-octene-(5)-yne-(3) are dissolved in 200 cc. of methanol and allowed to stand overnight with 20 grams of platinized charcoal (4 per cent.) in order to remove catalyst poisons. The coal is sucked off and washed out with 150 cc. of methanol. Thereupon, 4 grams of quinoline are added and the mixture is hydrogenated with 4 grams of palladium charcoal (4 per cent.) until 1 mol of hydrogen has been taken up. After sucking off the catalyst, the hydrogenation product is washed with ether, water is added and the mixture is extracted with ether. The ether solution is washed neutral, dried and boiled down. The 1-methoxy-2,6-dimethyl-2,7-dihydroxy-8-[2',6',6' - trimethyl - cyclohexene - (1') - yl] - octadiene-(3,5) [a viscous yellow oil; ultraviolet maximum: λ=242 mμ (ε=11'000)] thus obtained is dissolved in 250 cc. of toluene, placed in a flask equipped with a descending condenser, heated to boiling, whereupon a solution of 400 mg. of toluene sulphonic acid in hot toluene is added. The solution immediately boils more intensively and turns brown-red, while water distills off azeotropically. The solution is kept boiling for 15 minutes, cooled, washed neutral with bicarbonate solution and water successively, dried and concentrated in vacuo.

The concentrate, 1-methoxy-2,6-dimethyl-8-[2',6',6' − trimethylcyclohexene - (1') - yl] - octatetraene-(1,3,5,7) is diluted with petroleum ether for purification purposes and filtered through 100 grams of aluminium oxide. The filtrate is boiled down in vacuo and to cleave the ether 20 times its quantity of alcohol and the same quantity of 20 per cent. sulphuric acid are added. After standing for 12 hours at room temperature, water is added to the reaction solution, whereupon the same is extracted with ether and the ether solution is washed neutral, boiled down and chromatographed. When eluting with petroleum ether, the aldehyde remains behind in the column, while side products will be found in the filtrate. Finally, the column is eluted with petroleum ether with an addition of 1 per cent. acetone. Upon concentration, 24 grams of 2,6-dimethyl-8-[2',6',6'-trimethylcyclohexene-(1')-yl]-octatriene-(2,4,6)-al-(1) may thus be isolated. Ultraviolet-absorption maximum at 328 mμ.

8 grams of 2,6-dimethyl-8-[2',6',6'-trimethylcyclohexene - (1') - yl] - octatriene - (2,4,6) - al-(1) are dissolved in 20 cc. of ether and 15 cc. of acetylene-dimagnesium bromide are added to the solution. The mixture is shaken for 12 hours in a brown flask. Thereupon, ammonium chloride solution is added, the ether solution is washed, dried and boiled down. The residue is taken up in petroleum ether and chromatographed at an inactivated aluminum oxide column. Dark-coloured side products may be eluted with petroleum ether-acetone (20:1). The 1,18-di-[2',6',6' - trimethylcyclohexene - (1') - yl] - 3,7,12,16 - tetramethyl - 8,11 - dihydroxy - octadecahexaene-(2,4,6,12,14,16)-yne-(9) is eluted with ether with addition of 5 per cent. glacial acetic acid, and the eluate is washed neutral with water, dried and boiled down.

For dehydration purposes, the residue is dissolved in 35 cc. of toluene and heated to boiling for 15 minutes with a solution of 50 mg. of toluene sulphonic acid in 10 cc. of toluene. The dark red solution is thereafter diluted with petroleum ether, washed neutral and boiled down in vacuo. The residue is taken up in petroleum ether and chromatographed at an aluminium oxide column (activity grade I–II). It is developed with petroleum ether-benzene (10:1) and a yellow first running is separated as eluate. Thereupon dirty-coloured parts are removed from the upper end of the column, and the broad orange-red zone is eluted with absolute ether. After evaporation in vacuo, the eluate leaves behind a dark red oil which is dissolved in carbon disulphide. Alcohol is then added and the solution concentrated in vacuo until it begins to become cloudy. After standing for 12 hours at —10° C. the 9,9'-dehydro-β-carotene crystallizes out. Upon recrystallization from benzene-methanol, the red needles melt at 147° C. (in the evacuated tube). Ultraviolet-absorption maximum: λ=436 mμ (ε=105'000).

For purification purposes 113 mg. of 9,9'-dehydro-β-carotene are dissolved in 10 cc. of benzene (free from thiophene) and shaken with 200 mg. of Pt-SiO₂ (13 per cent. platinum on silica gel). The catalyst is sucked off and washed three times with 10 cc. each of benzene. The united solutions are concentrated under reduced pressure and, for the purpose of hydrogenation, benzene is added to obtain a volume of 10 cc. Upon addition of 0.05 gram of quinoline, the mixture is hydrogenated in the presence of 300 mg. of Pd-CaCO₃-catalyst inactivated with lead, until 5 cc. of H₂ have been taken up (calculated for 1 mol H₂=5.1 cc.). The catalyst is filtered off and washed out with petroleum ether. The red solutions are washed with 5 per cent. sulphuric acid and water and concentrated to 5 cc. In order to isomerize the cis-forms of the β-carotene, the concentrate is dissolved in 100 cc. of petroleum ether of boiling point 40–60° C., 2 mg. of iodine in 5 cc. of benzene are added and the mixture is heated to boiling for 30 minutes. Thereupon the mixture is concentrated under reduced pressure to 5 cc., 20 cc. of petroleum ether are added and the mixture is chromatographed at an aluminium oxide column (4 x 35 cm, activity grade IV). It is eluted with petroleum ether of boiling point 40–60° C. The first fraction contains 9,9'-dehydro-β-carotene. Crystals of melting point 170° C. can be isolated from the second fraction. The third fraction yields dark violet-red crystals of melting point 172° C. which, upon recrystallization from carbon disulphide-alcohol, melt at 178–179° C. in the evacuated tube. They consist of β-carotene. The melting point of the mixture with natural β-carotene (melting point 179° C.) does not shown any depression; the chloroform solution shows with antimonytrichloride a blue coloration which is typical for β-carotene and the ultraviolet spectrum is of the picture as characteristic of β-carotene.

EXAMPLE 2

23 grams of 2,6-dimethyl-8-[2',6',6'-trimethylcyclohexene - (1') - yl] - octatriene - (2,4,6) - al-(1), prepared according to Example 1, are dissolved in 50 cc. of absolute ether and shaken with 30 cc. of acetylene dimagnesium bromide for 12 hours, preferably in a dark flask. The mixture is then decomposed with ammonium chloride solution, the ether solution is washed, dried and evaporated in vacuo. The residue is distributed between petroleum ether and 98 per cent. methanol, whereby the desired 1,18-di-[2',6',6'-trimethylcyclohexene - (1') - yl] - 3,7,12,16-tetramethyl - 8,11 - dihydroxy - octadecahexaene - (2,4,6,12,-14,16)-yne-(9) goes over into the alcoholic aqueous phase. It is a highly viscous yellow oil with an absorption maximum at 280 mμ (ε=59'000).

16 grams of the above mentioned dihydroxy compound are dissolved in 150 cc. of toluene and 300 mg. of p-toluene sulphonic acid in hot toluene are added at boiling temperature. The dehydration immediately takes place under vigorous boiling up while the solution turns red. The same is allowed to boil for 15 minutes, cooled down, washed successively with bicarbonate and water, dried and evaporated carefully in vacuo at a maximum bath temperature of 50° C. The residue is dissolved in petroleum ether and chromatographed on a column of aluminium oxide (activity grade I–II). The chromatogram is developed with increasing quantities of benzene, whereby a yellow first running as eluate and discoloured polymerization products in the upper part of the column are separated. At last, the orange coloured main zone is eluted with petroleum ether-alcohol. After the evaporation of the solvent, 2 grams of red oil remain behind which are taken up in carbon disulphide and alcohol is added. By evaporating a part of the carbon disulphide in vacuo, light red crystals are separated (900 mg.). Upon recrystallizing twice from benzene-methanol, metal-like shining red leaflets are obtained which melt in the evacuated tube at 155–156° C. Ultraviolet absorption maxima: 433, 458 mμ (in hexane), 442, 470 mμ (in benzene), 460, 490 mμ (in carbon disulphide). Colour reaction with antimonytrichloride in chloroform: At first green, then very slowly blue.

220 mg. of this crystallisate (9,9'-dehydro-β-carotene) are dissolved in 15 cc. of benzene and, for purification purposes, left to stand for 12 hours with 200 mg. of Pt-SiO$_2$ and 300 mg. of Pt-carbon. The mixture is filtered, the filtrate is washed with 15 cc. of benzene and the united filtrates are hydrogenated by means of 600 mg. of Pd-CaCO$_3$-catalyst with the addition of 15 mg. of quinoline. 1 mol of hydrogen is taken up within 20 minutes. The spectrum now shows a main maximum at 450 mµ and a side maximum at 340 mµ. The catalyst is sucked off, the hydrogenation solution is diluted with hexane and washed with dilute sulphuric acid and water. In order to isomerize the product, the volume of the solution is first brought to 600 cc. by the addition of hexane and then allowed to stand for one hour in portions of 100 cc. with 700γ each of iodine in 1 cc. of hexane. Thereupon, the mixture is immediately chromatographed on a column of aluminium oxide (activity grade I-II). The orange zones of the trans-β-carotene which are formed after the development with petroleum ether-benzene (10:1) are united and eluted with petroleum ether-alcohol. After evaporation of the solvent in vacuo at low temperature there remains behind a crystalline residue which is recrystallized from benzene-methanol. The violet-red leaflets obtained melt in evacuated tubes at 179–180° C. and show no depression of melting point when mixed with natural all-trans-β-carotene (melting point 178° C.). Ultraviolet absorption maxima 452, 480 mµ (in hexane). The cis-isomers obtained as by-products yield, upon renewed isomerization with iodine, a further quantity of pure trans-β-carotene. The yield can furthermore be increased by repeated chromatography of the mother liquors. Total yield of pure all-trans-β-carotene from dehydro-β-carotene: 33 per cent.

EXAMPLE 3

3 parts by weight of 9,9'-deyhdro-β-carotene of melting point 156° C. (prepared according to Example 2) are hydrogenated, under exclusion of light and at the lowest possible temperature, in benzene by means of partially poisoned palladium-calciumcarbonate-catalyst. After 1 mol of hydrogen has been taken up, the catalyst is filtered off, the benzene solution is concentrated in vacuo and crystallization is brought about by sprinkling with methanol. The crystals are separated in a centrifuge, washed with methanol and further recrystallized twice from benzene-methanol in a few minutes. The 9,9'-mono-cis-β-carotene dried in high vacuo at 20° C. melts at 151° C. Absorption maxima in hexane: 338 mµ ($\epsilon$=52'000), 450 mµ ($\epsilon$=92'500) and 477 mµ ($\epsilon$=76'000).

1 part by weight of cis-β-carotene in 100–250 parts by volume of hexane under carbonic acid is exposed to diffuse day-light for 2–4 hours. The solution thereupon shows the pure absorption spectrum of all-trans-β-carotene. In order to isolate the β-carotene formed, the hexane solution is adsorbed onto a column of aluminium oxide and the chromatogram is developed with cyclohexane-benzene. The orange coloured main zone is eluted with cyclohexane-alcohol. After evaporation of the solvent in vacuo, red crystals of melting point 178° C. are obtained from benzene-methanol; absorption maxima in hexane: 452 mµ and 480µ. The yield, calculated from cis-β-carotene, is almost quantitative.

EXAMPLE 4

1 part by weight of cis-β-carotene, prepared according to Example 3 is heated, under carbonic acid on a water-bath in the dark, in 100–250 parts by volume of hexane for 2–3 hours at 70° C. Thereupon, the solution shows substantially the absorption spectrum of the all-trans-β-carotene. For further working up, the indications of Example 3 can be followed.

EXAMPLE 5

8.4 grams of 1,18-di-[2',6',6'-trimethylcyclohexene - (1') - yl] - 3,7,12,16 - tetramethyl - 8,11-dihydroxy - octadecahexaene - (2,4,6,12,14,16) - yne-(9) (prepared according to Example 1 or 2) are dissolved in 50 cc. of methanol and, for purification purposes, allowed to stand for 12 hours with 5 grams of platinized charcoal (5 per cent.). The coal is sucked off and washed with 50 cc. of methanol. After addition of 0.5 gram of quinoline and 1.6 grams of palladium charcoal (4 per cent.), the mixture is partially hydrogenated until 80 per cent. of 1 mol of hydrogen have been taken up. After filtering off the catalyst, 300 cc. of water are added and extracted with ether. The ether solution is washed with 1 N sulphuric acid and water, dried and evaporated. The residue, a viscous yellow oil, is dissolved in 50 cc. of toluene and a hot solution of 200 mg. of toluene sulphonic acid in 30 cc. of toluene is added at boiling heat under a nitrogen atmosphere. The solution immediately turns red. It is heated to boiling for 15 minutes, after cooling diluted with 100 cc. of petroleum ether, washed successively with bicarbonate and water, dried and boiled down. The red residue is taken up in 50 cc. of petroleum ether and the solution is shaken three times with 30 cc. each of 95 per cent. methanol. Thereupon, the petroleum ether solution is washed twice with water, dried and chromatographed on a column (3 x 40 cm.) of aluminium oxide (activity grade I-II). Already during the development with petroleum ether, yellow coloured cleavage products go into the filtrate. By petroleum ether with an addition of 10 per cent. benzene, further quantities of yellow by-products are eluted. An orange zone of an approximate breadth of 8 cm. can now be recognized in the middle of the column underneath of which lighter coloured, broad, yellow zones are joined. In the upper part of the column, dirty coloured resinous zones can be recognized. The column is now blown dry with the aid of nitrogen and divided. The orange zone is eluted with petroleum ether-alcohol (20:1). The solution shows the absorption maxima of β-carotene which however are of low intensity. The alcohol is removed by washing with water and the dried petroleum ether solution is once again chromatographed on an aluminium oxide column of 2 x 30 cm. (activity grade I-II). The chromatogram is developed with increasing quantities of benzene until an orange zone distinctly separates. This orange zone is cut out and eluted with ether. The solution shows the absorption maxima of β-carotene. After evaporation of the ether in vacuo, the red residue is taken up in 2 cc. of carbon disulphide and 8 cc. of alcohol are added. Then the mixture is concentrated cautiously until it starts to become cloudy. After standing overnight in an ice-box, red crystals separate. Gross yield: 20 mg. After two recrystallizations from benzene-methanol, the red-violet leaflets melt at 178–179° C. λ$_{max.}$=452,480 mμ (in hexane). The melting point of the mixture with natural all-trans-β-carotene shows no depression.

EXAMPLE 6

2.65 grams of 1-methoxy-2-methyl-butene-(1)-yne-(3) in 20 cc. of ether are reacted with 0.024 mols of lithium phenyl. In order to terminate the reaction, the mixture is heated to boiling for 45 minutes. After cooling 4.2 grams of 4-[2',6',6'-trimethylcyclohexene - (1') - yl] - 2 - methyl-butene-(2)-al-(1) in 20 cc. of ether are added dropwise and, after standing overnight, heated to boiling for ½ hour. After cooling, the mixture is decomposed with ammonium chloride solution and the ether layer is dried and evaporated. The residue is dissolved in petroleum ether (75 cc.) and shaken out four times with 25 cc. each of 95 per cent. methanol. The methanol extracts furnish 2.7 grams of 1-methoxy-2,6-dimethyl-5-hydroxy - 8 - trimethyl - cyclohexenyl - octadiene-(1,6)-yne-(3) in the form of a viscous yellow oil. The determination according to Zerewitinoff shows 1 atom of active hydrogen.

1.6 grams of 1 - methoxy - 2,6 - dimethyl - 5 - hydroxy - 8 - [2',6',6' - trimethylcyclohexene-(1') - yl] - octadiene - (1,6) - yne - (3) are dissolved in 6 cc. of toluene and added dropwise to 1.2 grams of phosphorus oxychloride in 8 cc. of toluene and 4 cc. of pyridine. The mixture is warmed to 90–95° C. for 45 minutes, poured onto ice after cooling and washed with dilute sulphuric acid while adding ether. The ether layer is washed neutral, dried and evaporated. The residue is dissolved in petroleum ether and chromatographed on aluminum oxide. By the aid of petroleum ether 0.8 gram of a yellow oil are eluted which, according to the working method described in Example 1, are transformed into the 2,6-dimethyl - 8 - [2',6',6'-trimethylcyclohexene - (1') - yl] - octadiene - (5,7) -yne - (3) - al - (1) (Ultraviolet absorption maximum of the phenylsemicarbazone derivative at 275 mμ and 359 mμ) or into the dihydroxytetraenetriyne compound with 40 carbon atoms and hereafter into β-carotene.

We claim:

1. A process which comprises subjecting a compound selected from the group consisting of 1-hydrocarbonoxy - 2,6-dimethyl - 8-[2',6',6'-trimethylcyclohexene-(1') - yl] - octatetraene-(1,3,5,7) and 1-hydrocarbonoxy-2,6-dimethyl-8-[2',6',6' - trimethylcyclohexene - (1')-yl]-octatriene-(1,5,7)-yne-(3) to acid cleavage to produce a second compound respectively selected from the group consisting of 2,6-dimethyl-8-[2',6',6' - trimethylcyclohexene - (1')-yl]-octatriene - (2,4,6)-al-(1) and 2,6 - dimethyl - 8-[2',6',6'-trimethylcyclohexene - (1')-yl]- octadiene-(5,7)-yne-(3)-al-(1), condensing said second compound with acetylene to produce a third compound respectively selected from the group consisting of 1,18 - di-[2',6',6'-trimethylcyclohexene-(1') - yl] - 3,7,12,16-tetramethyl-8,11-dihydroxy - octadecahexaene - (2,4,6,12,14,16)-yne-(9) and 1,18-di-[2',6',6'-trimethylcyclohexene-(1')-yl] - 3,7,12,16 - tetramethyl - (1,3,15,17) - triynehydroxy-octadecatetraene - (5,9,13), subjecting said third compound to a treatment which comprises successive steps of dehydration and hydrogenation to produce 9,10-mono-cis - 1,18-di-[2',6',6'-trimethylcyclohexene - (1')-yl] - 3,7,12,16 - tetramethyl-octadecanonaene - (1,3,5,7,9,11,13,15,17), and isomerizing the latter to produce all-trans-β-carotene.

2. A process which comprises subjecting 1-hydrocarbonoxy - 2,6 - dimethyl-8-[2',6',6' - trimethylcyclohexene - (1') - yl] - octatetraene-(1,3,5,7) to acid cleavage to produce 2,6-dimethyl - 8 - [2',6',6'-trimethylcyclohexene-(1')-yl]-octatriene - (2,4,6) -al-(1), condensing the latter with acetylene to produce 1,18-di-[2',6',6'-trimethylcyclohexene - (1')-yl] - 3,7,12,16-tetramethyl - 8,11-dihydroxy - octadecahexaene-(2,4,6,12,14,16) - yne-(9), subjecting the latter to dehydration to produce 1,18-di-[2'6',6'-trimethylcyclohexene - (1')-yl] - 3,7,12,16-tetramethyloctadecaoctaene - (1,3,5,7,11,13,15,17)-yne-(9), hydrogenating the latter to produce 9,10-mono-cis-1,18-di - [2',6',6'-trimethylcyclohexene-(1') - yl]-3,7,12,16 - tetramethyl-octadecanonaene - (1,3,5,7,9,11,13,15,17), and isomerizing the latter to produce all-trans-β-carotene.

3. A compound selected from the group consisting of 2,6 - dimethyl - 8-[2',6',6'-trimethylcyclohexene - (1')-yl]-octatriene-(2,4,6)-al-(1) and 2,6-dimethyl - 8-[2',6',6' - trimethylcyclohexene - (1')-yl]-octadiene - (5,7)-yne-(3)-al-(1).

4. 2,6-dimethyl - 8-[2',6',6'. - trimethylcyclohexene - (1')-yl]-octatriene-(2,4,6)-al-(1).

5. 2,6 - dimethyl-8-[2',6',6' - trimethylcyclohexene - (1')-yl]-octadiene - (5,7)-yne-(3)-al-(1).

6. A compound selected from the group consisting of 1,18-di-[2',6',6'-trimethylcyclohexene-(1') - yl]-3,7,12,16 - tetramethyl - 8,11 - dihydroxy - octadecahexaene - (2,4,6,12,14,16)-yne-(9) and 1,18-di-[2',6',6'-trimethylcyclohexene-(1')-yl]-3,7,12,16-tetramethyl - 8,11-dihydroxy-octadecatetraene - (1,3,15,17) - triyne-(5,9,13).

7. 1,18-di - [2',6',6' - trimethylcyclohexene-(1')-yl] - 3,7,12,16-tetramethyl-8,11-dihydroxy-octadecahexaene - (2,4,6,12,14,16)-yne-(9).

8. 1,18 - di-[2',6',6' - trimethylcyclohexene-(1')-yl] - 3,7,12,16 - tetramethyl - octadecaoctaene-(1,3,5,7,11,13,15,17)-yne-(9).

9. 9,10-mono-cis-1,18-di-[2',6',6' - trimethylcyclohexene - (1')-yl]-3,7,12,16 - tetramethyl-octadecanonaene-(1,3,5,7,9,11,13,15,17).

HANS HERLOFF INHOFFEN.
FERDINAND BOHLMANN.

References Cited in the file of this patent

UNITED STATES PATENTS

| Number | Name | Date |
| --- | --- | --- |
| 2,369,159 | Milas | Feb. 15, 1945 |
| 2,451,735 | Isler | Oct. 19, 1948 |
| 2,451,736 | Isler | Oct. 19, 1948 |
| 2,451,737 | Isler | Oct. 19, 1948 |
| 2,451,738 | Isler | Oct. 19, 1948 |
| 2,529,498 | Isler | Nov. 14, 1950 |

OTHER REFERENCES

Inhoffen et al., Chem. Abstracts, vol. 44, col. 8890, 1 page only (1950).